US009005987B2

(12) United States Patent
Kartalov et al.

(10) Patent No.: US 9,005,987 B2
(45) Date of Patent: Apr. 14, 2015

(54) METHODS FOR QUANTITATIVE TARGET DETECTION AND RELATED DEVICES AND SYSTEMS

(75) Inventors: Emil P. Kartalov, Pasadena, CA (US); Axel Scherer, Laguna Beach, CA (US); Clive R. Taylor, Malibu, CA (US)

(73) Assignees: University of Southern California, Los Angeles, CA (US); California Institute of Technology, Pasadena, CA (US)

( * ) Notice: Subject to any disclaimer, the term of this patent is extended or adjusted under 35 U.S.C. 154(b) by 1141 days.

(21) Appl. No.: 12/761,299

(22) Filed: Apr. 15, 2010

(65) Prior Publication Data

US 2010/0267162 A1 Oct. 21, 2010

Related U.S. Application Data

(60) Provisional application No. 61/170,031, filed on Apr. 16, 2009.

(51) Int. Cl.
*G01N 27/22* (2006.01)
*B01L 3/00* (2006.01)
*G01N 27/00* (2006.01)

(52) U.S. Cl.
CPC ... *B01L 3/502753* (2013.01); *B01L 2200/0647* (2013.01); *B01L 2300/0645* (2013.01); *B01L 2300/0816* (2013.01); *B01L 2300/0864* (2013.01)

(58) Field of Classification Search
CPC .................... A01B 12/0006; B01L 3/502753; B01L 2200/0647; B01L 2300/0816; B01A 2300/0645
USPC .................... 436/149, 518; 422/82.01, 82.02; 435/287.2
See application file for complete search history.

(56) References Cited

U.S. PATENT DOCUMENTS

| | | | | |
|---|---|---|---|---|
| 5,238,649 | A * | 8/1993 | Nason | 422/411 |
| 8,361,738 | B2 | 1/2013 | Kartalov et al. | |
| 2001/0026929 | A1 | 10/2001 | Yang et al. | |
| 2003/0199100 | A1 | 10/2003 | Wick | |
| 2004/0067502 | A1 | 4/2004 | Guenther et al. | |
| 2004/0191789 | A1 * | 9/2004 | Manaresi et al. | 435/6 |
| 2006/0127238 | A1 | 6/2006 | Mosier et al. | |
| 2007/0202536 | A1 * | 8/2007 | Yamanishi et al. | 435/7.1 |
| 2008/0013092 | A1 * | 1/2008 | Maltezos et al. | 356/417 |
| 2009/0269767 | A1 * | 10/2009 | Soderlund et al. | 435/6 |

OTHER PUBLICATIONS

1-Notice of Allowance issued for U.S. Appl. No. 12/717,402, filed on Mar. 4, 2010 in the name of Emil P. Kartalov et al.. Mail date: Nov. 21, 2012.
2-Kartalov, E.P. "Multiplexed microfluidic immunoassays for point-of-care in vitro diagnostics." In-Vitro Diagn. Technology 2006. Web. <http://www.ivdtechnology.com/article/multiplexed-microfluidic-immunoassays-point-care-vitro-diagnostics>.
Gilbert, H., et al., Point of Care Technologies, Int. Anestheiol. Clin. 2004, 42: 73-94.
Kartalov, E., et al., High-throughput multi-antigen microfluidic fluorescence immunoassays, BioTechniques 2006, 40: 85-90.

(Continued)

*Primary Examiner* — Rebecca M Fritchman
(74) *Attorney, Agent, or Firm* — Steinfl & Bruno LLP

(57) ABSTRACT

Described herein are methods for quantitative target detection in a sample through use of microbeads and related devices and systems.

26 Claims, 8 Drawing Sheets

(56) References Cited

OTHER PUBLICATIONS

Kartalov, E., et al., Internally calibrated quantification of protein analytes in human serum by fluorescence immunoassays in disposable elastomeric microfluidic devices, Electrophoresis 2008, 29: 5010-5016.
Lin, D., et al., Internally calibrated quantification of VEGF in human plasma by fluorescence immunoassays in disposable elastomeric microfluidic devices, Journal of Chromatography B 2010, 878: 258-263.
Kartalov, E., et al., The analytical approach to polydimethylsiloxane microfluidic technology and its biological applications, Journal of Nanoscience and Nanotechnology 2006, 6: 2265-2277.
Sohn, L., et al., Capacitance cytometry: Measuring biological cells one by one, PNAS 2000, 97: 10687-10690.
Kartalov, E., et al., Micro¯ uidic device reads up to four consecutive base pairs in DNA sequencing-by-synthesis, Nucleic Acids Research 2004, 32: 2873-2879.
Thorsen, T., et al., Microfluidic large-scale integration, Science 2002, 298: 580-584.
Kartalov, E., et al., Microfluidic vias enable nested bioarrays and autoregulatory devices in Newtonian fluids, PNAS 2006, 103: 12280-12284.
Mulvaney, S.P., et al., Rapid, femtomolar bioassays in complex matrices combining microfluidics and magnetoelectronics, Biosciences and Bioelectronics 2007, 23: 191-200.
Kartalov, E., et al., Polyelectrolyte surface interface for single-molecule fluorescence studies of DNA polymerase, BioTechniques 2003, 34: 505-509.
Braslaysky, I., et al., Sequence information can be obtained from single DNA molecules, PNAS 2003, 100: 3960-3964.
Unger, M., et al., Monolithic microfabricated valves and pumps by multilayer soft lithography, Science 2000, 288: 113-116.
VanDelinder, V., et al., Separation of plasma from whole human blood in a continuous cross-flow in a molded microfluidic device, Analytical Chemistry 2006, 78: 3765-3771.
Fan, R., et al., Integrated barcode chips for rapid, multiplexed analysis of proteins in microliter quantities of blood, Nature Biotechnology 2008, 24: 1373-1378.
Restriction Requirement for U.S. Appl. No. 12/717,402, filed on Mar. 4, 2010 in the name of Emil P. Kartalov et al. Mail Date: Mar. 19, 2012.
Non-Final Office Action for U.S. Appl. No. 12/717,402, filed on Mar. 4, 2010 in the name of Emil P. Kartalov et al. Mail Date: May 7, 2012.
Final Office Action for U.S. Appl. No. 12/717,402, filed on Mar. 4, 2010 in the name of Emil P. Kartalov et al. Mail Date: Sep. 24, 2012.
Angenendt, P., et al., 3D Protein Microarrays: Performing Multiplex Immunoassays on a Single Chip, *Anal. Chem.* 75 (2003) 4368-4372.
Armani A.M., et al., Label-free, single-molecule detection with optical microcavities, Science, vol. 317 Aug. 10, 2007, pp. 783.
Bai, Y. et al., Surface Modification for Enhancing Antibody Binding on Polymer-Based Microfluidic Device for Enzyme-Linked Immunosorbent Assay, *Langmuir* 22 (2006) pp. 9458-9467.
Belfort, et al., The behavior of suspensions and macromolecular solutions in crossflow microfiltration, *J. Membr. Sci.* 96, 1-58 (1994).
Bhattacharyya, A. et al., Design and testing of a disposable microfluidic chemiluminescent immunoassay for disease biomarkers in human serum samples, Biomed Microdevices 9 (2) (2007) pp. 245-251.
Chandrasekaran, A., et al., Hybrid Integrated Silicon Microfluidic Platform for Fluorescence Based Biodetection, Sensors 7 (2007) pp. 1901-1915.
Delamarche, E., et al., Patterned Delivery of Immunoglobulins to Surfaces Using Microfluidic Networks, Science 276 (1997) 779.
Delehanty, J.B., et al., A Microarray Immunoassay for Simultaneous Detection of Proteins and Bacteria, *Anal. Chem.* 74 (2002) 5681-5687.
Dong, H. et al., Screen-printed microfluidic device for electrochemical immunoassay, *Lab on a Chip 7* (2007) pp. 1752-1758.
Eteshola, E., et al., Microfluidic ELISA: On-Chip Fluorescence Imaging, *Biomedical Microdevices* 6 (1) (2004) pp. 7-9.
Fruetel, J.A., et al., Microchip separations of protein biotoxins using an integrated hand-held device, *Electrophoresis* 26 (2005) 1144-1154.
Hansen, C.L., et al., Systematic investigation of protein behavior with a microfluidic formulator, 2004, vol. 101:40, pp. 14431-14436.
Herr, A.E., et al., On-Chip Native Gel Electrophoresis-Based Immunoassays for Tetanus Antibody and Toxin, *Anal. Chem.* 77 (2005) 585-590.
Herrmann, M., et al., Enzymatically-generated fluorescent detection in micro-channels with internal magnetic mixing for the development of parallel microfluidic ELISA, *Lab Chip* 6 (2006) pp. 555-560.
Herrmann, M., et al., Microfluidic ELISA on non-passivated PDMS chip using magnetic bead transfer inside dual networks of channels, *Lab Chip* 7 (2007) pp. 1546-1552.
Holmes, D., et al., Bead-based immunoassays using a micro-chip flow cytometer†, *Lab Chip* 7 (2007) 1048-1056.
Honda, N. et al. Simultaneous Multiple Immunoassays in a Compact Disc-Shaped Microfluidic Device Based on Centrifugal Force, *Clin. Chem.* 51 (10) (2005) pp. 1955-1961.
Hotz, H.G. et al. Surgery 137 (2) (2005) 192.
Jiang, X. et al., A Miniaturized, Parallel, Serially, Diluted Immunoassay for Analyzing Multiple Antigens, *J. Am. Chem. Soc.* 125 (2003) pp. 5294-5295.
Kanda, V., et al., Label-Free Reading of Microarray-Based Immunoassays with Surface Plasmon Resonance Imaging, *Anal. Chem.* 76 (2004) pp. 7257-7262.
Kim, S.H. et al., Simple Route to Hydrophilic Microfluidic Chip Fabrication using an Ultraviolet (UV)—Cured Polymer, *Adv. Funct. Mater.* 17 (2007) pp. 3493-3498.
Kurita, R., et al., On-Chip Enzyme Immunoassay of a Cardiac Marker Using a Microfluidic Device Combined with a Portable Surface Plasmon Resonance System, *Anal. Chem.* 78 (2006) pp. 5525-5531.
Levine, A.M. et al., Phase I Study of Antisense Oligonucleotide Against Vascular Endothelial Growth Factor: Decrease in Plasma Vascular Endothelial Growth Factor with Potential Clinical Efficacy, *J. Clin. Oncol.* 24 (2006) pp. 1712-1719.
Liang, K., et al., Simultaneous detection of five indices of hepatitis B based on an integrated automatic microfluidic device, Biomed Microdevices 9 (3) (2007) pp. 325-333.
Lin, F.Y.H. et al., Development of a novel microfluidic immunoassay for the detection of *Helicobacter pylori* infection, Analyst 129 (2004) pp. 823-828.
Linder, V., et al., Application of surface biopassivated disposable poly(dimethylsiloxane)/glass chips to a heterogeneous competitive human serum immunoglobulin G immunoassay with incorporated internal standard, Electrophoresis 23 (2002) pp. 740-749.
Liu, Y.J. et al., Integration of minisolenoids in microfluidic device for magnetic bead-based immunoassays, *J. Appl. Phys.* 102 (2007) 084911.
Lucas, L.J., et al., Lab-on-a-chip immunoassay for multiple antibodies using microsphere light scattering and quantum dot emission, Biosensors and Bioelectronics 23 (2007) pp. 675-681.
Misiakos, K., et al., A Monolithic Silicon Optoelectronic Transducer as a Real-Time Affinity Biosensor, Anal. Chem. 76 (2004) pp. 1366-1373.
Murphy, B.M., et al., Competitive Immunoassays for Simultaneous Detection of Metabolites and Proteins Using Micromosaic Patterning, Anal. Chem. 80 (2008) pp. 444-450.
Nashida, N., et al., Electrochemical immunoassay on a microfluidic device with sequential injection and flushing functions, Biosensors and Bioelectronics 22 (2007) pp. 3167-3173.
Nelson, K.E., et al., Concentration Gradient Immunoassay. 1. An Immunoassay Based on Interdiffusion and Surface Binding in a Microchannel, Anal. Chem. 79 (2007) pp. 3542-3548.
Phillips, K.S., et al., Microfluidic Immunoassay for Bacterial Toxins with Supported Phospholipid Bilayer Membranes on Poly(dimethylsiloxane), *Anal. Chem.* 77 (2005) pp. 327-334.
Piyasena, M.E., et al., Near-Simultaneous and Real-Time Detection of Multiple Analytes in Affinity Microcolumns, *Anal. Chem.* 76 (2004) pp. 6266-6273.

(56) References Cited

OTHER PUBLICATIONS

Pugia, M.J. et al. Microfluidic Tool Box as Technology Platform for Hand-Held Diagnostics, *Clin. Chem.* 51 (10) (2005) 1923.
Sapsford, K.E., et al., Demonstration of Four Immunoassay Formats Using the Array Biosensor, *Anal. Chem.* 74 (2002) 1061-1068.
Sia, S.K., et al., An Integrated Approach to a Portable and Low-cost Immunoassay for Resource-Poor Settings, *Angew. Chem. Int. Ed.* 43 (2004) pp. 498-502.
Sui, G., et al., Solution-Phase Surface Modification in Intact Poly(dimethylsiloxane) icrofluidic Channels, Anal. Chem. 78 (2006) pp. 5543-5551.
Sydor, J.R., et al., Chip-Based Analysis of Protein-Protein Interactions by Fluorescence Detection and On-Chip Immunoprecipitation Combined with µLC-MS/MS Analysis, *Anal. Chem.* 75 (2003) 6163-6170.
Wang, J., et al., Electrochemical Enzyme Immunoassays on Microchip Platforms, *Anal. Chem.* 73 (2001) 5323-5327.
Wang, Z.H., et al., A label-free protein microfluidic array for parallel immunoassays, Electrophoresis 27 (2006) pp. 4078-4085.
Wolf, M., et al., Simultaneous detection of C-reactive protein and other cardiac markers in human plasma using micromosaic immunoassays and self-regulating microfluidic networks, Biosensors and Bioelectronics 19 (2004) 1193-1202.
Yakovleva, J., et al., Microfluidic Enzyme Immunoassay Using Silicon Microchip with Immobilized Antibodies and Chemiluminescence Detection, Anal. Chem. 74 (2004) pp. 2994-3004.
Zydney, A.L., et al., Continuous flow membrane plasmapheresis: theoretical models for flux and hemolysis prediction, *Trans. Am. Soc. Artif. Intern. Organs* 28, 408-412 (1982).

* cited by examiner

METHODS FOR QUANTITATIVE TARGET DETECTION AND RELATED DEVICES AND SYSTEMS

CROSS REFERENCE TO RELATED APPLICATIONS

This application claims priority to U.S. provisional application Ser. No. 61/170,031, filed on Apr. 16, 2009 entitled “Viral Detection by Microfluidic Immunoassays in Human Samples and in Aerosols”, incorporated herein by reference in its entirety. The present application may be related to U.S. patent application Ser. No. 12/717,402 filed on Mar. 4, 2010 herein also incorporated by reference in its entirety.

STATEMENT OF GOVERNMENT GRANT

The U.S. Government has certain rights in this invention pursuant to Grant No. DK078938 and Grant No. 4R00EB007151-03 awarded by National Institutes of Health.

FIELD

The present disclosure relates to quantitative target detection and in particular to methods for quantitative detection and related devices and systems.

BACKGROUND

High sensitivity detection of targets and in particular of biomarkers has been a challenge in the field of biological molecule analysis, in particular when aimed at detection of a plurality of targets. Whether for pathological examination or for fundamental biology studies, several methods are commonly used for the detection of various classes of biomaterials and biomolecules.

In several applications, including in particular those for which ubiquitous testing is desirable, the current biological techniques has been reduced from the macro- to the micro-scale, and more particularly in multi-analyte high-throughput handheld devices. In particular, reducing assays (e.g. immunoassays) to microfluidic scale has been extensively explored in recent years). In spite of various efforts and products, the capability to measure multiple antigens and samples per device, an industrially feasible fabrication, parsimony of sample and reagents, adequate sensitivity and specificity, and/or adequate reliability and reproducibility still remain a challenge.

SUMMARY

Provided herein, are microfluidic devices, methods and systems that in several embodiments, allow reproducible quantification of targets even in complex fluids such as human serum or other bodily fluids in elastomeric microfluidic devices.

According to a first aspect, a microfluidic target sampler is described. The sampler comprises: a microfluidic chip adapted to comprise a solution of microbeads; a conveyor adapted to convey collected targets to the microfluidic chip; a capture area adapted to capture the microbeads in presence of the targets; and electrodes connected with the capture area, the electrodes adapted to measure a change of the capture area dependent on an amount of captured microbeads, thus detecting the capture of the microbeads.

According to a second aspect, a method of using a microfluidic target sampler is provided, the method comprising detecting target concentration through a single microfluidic target sampler, the single microfluidic target sampler being the microfluidic target sampler of the above first aspect, and wherein the amount of captured microbeads is substantially proportional to target concentration.

According to a third aspect, a method to measure target concentration in a sample is provided, comprising: feeding known target concentrations to the microfluidic target sampler of the first aspect; for each known target concentration, measuring a capacitance change associated to capture of microbeads and expressing said capacitance change in terms of a fraction of captured microbeads, each fraction related to a known target concentration, thus obtaining a fraction versus concentration function; feeding an unknown target concentration to the microfluidic target sampler of the first aspect; for the unknown target concentration, measuring a capacitance change associated to capture of microbeads and expressing said capacitance change in terms of a fraction of captured microbeads, the fraction related to the unknown target concentration; and comparing the fraction related to the unknown target concentration with the fraction versus concentration function to measure the unknown target concentration.

According to a fourth aspect, an arrangement of multiple microfluidic target samplers, comprising a plurality of microfluidic target samplers according to the first aspect. The microfluidic target samplers can be serially connected to each other, and the uncaptured targets travel, during operation, from one microfluidic target sampler to another microfluidic target sampler.

According to a fifth aspect, a method for microfluidic detection of targets is provided, comprising: providing a microfluidic solution of microbeads; conveying collected targets to the microfluidic solution of microbeads; activating the microbeads; capturing the microbeads in presence of the targets forming microbead-target complexes; and detecting the targets by measuring changes due to presence of the microbead-targets complexes.

According to a sixth aspect, an apparatus is provided, comprising: a plurality of reservoirs commonly exposed to a target-containing sample, each reservoir containing a set number of microbeads; a plurality of arrangements according to the fourth aspect, each arrangement connected to a respective reservoir of the plurality of reservoirs, thus measuring a plurality of capacitance changes to associate each capacitance change to a respective set number of microbeads and express variation of numbers of microbeads as a function of captured microbeads.

According to a seventh aspect, a method to measure target concentration in a sample is provided, comprising: exposing a plurality of reservoirs to a target-containing sample, each reservoir containing a set number of microbeads; connecting each reservoir to an arrangement according to the third aspect, thus forming a plurality of arrangements; for each arrangement, measuring a capacitance change associated to capture of microbeads, thus obtaining a plurality of capacitance changes, each capacitance change associated to a set number of microbeads; expressing each capacitance change in terms of fraction of the set number of microbeads that have been captured, thus obtaining a plurality of fractions, each fraction associated to a set number of microbeads, thereby establishing fraction of captured microbeads as a function of number of microbeads; selecting a number of microbeads inside a region of the function; and associating the selected number of microbeads to a concentration value to form a calibration when input concentration of the target is known, or associating the selected number of microbeads to a concentration value through a known calibration, to measure unknown concentration of the target in the sample.

According to an eighth aspect, a method to measure target concentration in a sample is provided, comprising: a) exposing a plurality of reservoirs to a target-containing sample, each reservoir containing a set number of microbeads, the number of microbeads of one reservoir being different from the number of microbeads of another reservoir, each reservoir connected to an arrangement according to the fourth aspect, thus forming a plurality of arrangements; b) feeding to the plurality of reservoirs known target concentrations; b1) for each arrangement, measuring a capacitance change associated to capture of microbeads, thus obtaining a plurality of capacitance changes, each capacitance change associated to a set number of microbeads, and b2) for each set number of microbeads, expressing each capacitance change in terms of fraction of the set number of microbeads that have been captured, thus obtaining a plurality of fraction versus concentration functions; c) feeding to the plurality of reservoirs an unknown target concentration; c1) for each arrangement, measuring a capacitance change associated to capture of microbeads, thus obtaining a plurality of capacitance changes, each capacitance change associated to a set number of microbeads; c2) for each set number of microbeads, expressing each capacitance change in terms of fraction of the set number of microbeads that have been captured, thus obtaining a fraction versus number of microbeads function; and d) comparing the fraction versus number of microbeads function with the plurality of fraction versus concentration functions to find the unknown target concentration.

The devices, methods and systems herein described allow in several embodiments, reliable and cost effective testing systems that also allow reproducible quantification of samples such as air and/or complex sample such as human bodily fluid or a derivative thereof (e.g. plasma), and in particular human serum.

The devices methods and systems herein described allow in several embodiments, microfluidic detection of viruses through immunoassays against their shell proteins. In addition, devices methods and systems herein described allow in several embodiments, the scheme of continuous viral monitoring by bead immunoassays and their detection by a capacitance measurement to trigger a PCR measurement also has not been previously described.

Furthermore, the devices methods and systems herein described allow in several embodiments, measurement of multiple antigens and samples per device, with sensitivity specificity, reliability and reproducibility.

The devices methods and systems herein described can be used in connection with applications wherein operation of a microfluidic device is desired, including for example performance of various kind of assays in a microfluidic environment, including high throughput, multiplexed assays, directed for example to target detection. As a consequence, exemplary fields where the power source, arrangements, methods and devices herein described can be used include medical, diagnostics, biological research, and veterinary.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the detailed description and examples sections, serve to explain the principles and implementations of the disclosure.

DETAILED DESCRIPTION

Figure 1:
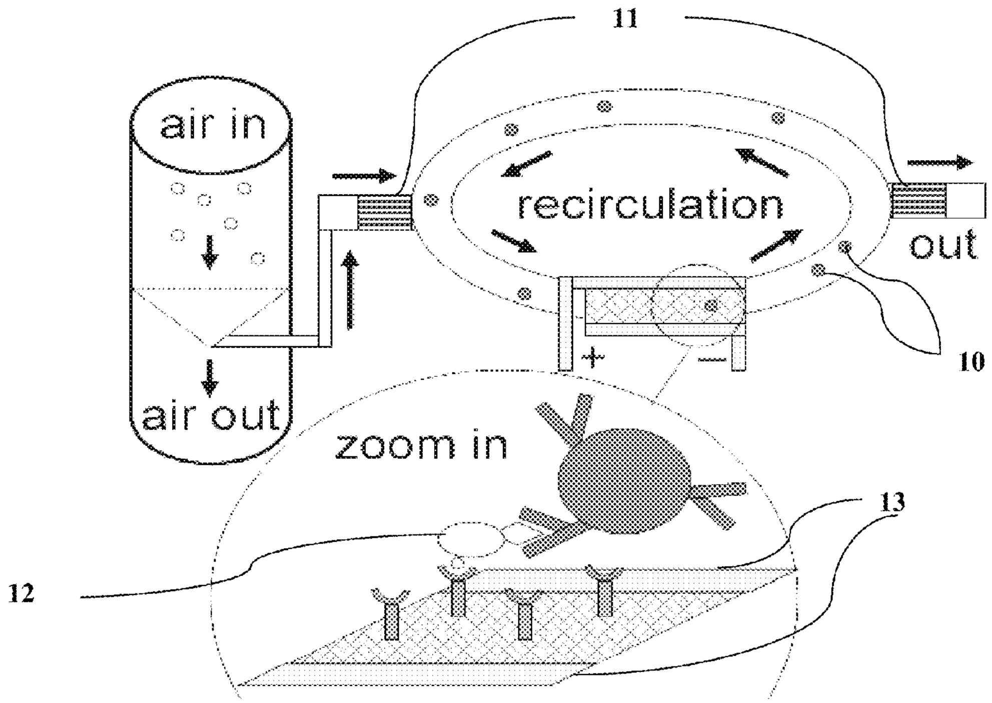
FIG. 1 shows a schematic illustration of a detection device and system according to an embodiment herein described

Provided herein are devices methods and systems for quantitative detection of targets in microfluidic devices.

The term "detect" or "detection" as used herein indicates the determination of the existence, presence or fact of a target or signal in a limited portion of space, including but not limited to a sample, a reaction mixture, a molecular complex and a substrate. A detection is "quantitative" when it refers, relates to, or involves the measurement of quantity or amount of the target or signal (also referred as quantitation), which includes but is not limited to any analysis designed to determine the amounts or proportions of the target or signal. A detection is "qualitative" when presence or absence of the target of signal is detected, without necessarily quantifying the amount present.

The term "target" as used herein indicates an analyte of interest. The term "analyte" refers to a substance, compound or component whose presence or absence in a sample has to be detected. Analytes include but are not limited to biomolecules and in particular biomarkers. The term "biomolecule" as used herein indicates a substance compound or component associated to a biological environment including but not limited to sugars, aminoacids, peptides proteins, oligonucleotides, polynucleotides, polypeptides, organic molecules, haptens, epitopes, biological cells, parts of biological cells, vitamins, hormones and the like. The term "biomarker" indicates a biomolecule that is associated with a specific state of a biological environment including but not limited to a phase of cellular cycle, health and disease state. The presence, absence, reduction, upregulation of the biomarker is associated with and is indicative of a particular state.

The term "sample" as used herein indicates a limited quantity of something that is indicative of a larger quantity of that something, including but not limited to fluids from a biological environment, specimen, cultures, tissues, commercial recombinant proteins, synthetic compounds or portions thereof. Exemplary samples comprise whole blood, serum, plasma, cerebrospinal fluid, saliva, urine, vaginal fluid, sweat, oral swab extract, tears, and biopsy samples.

In some embodiments, the target is formed a shell protein of a virus or other biomarker characterizing other pathogens and detection is performed by immunoassays keyed against those shell protein/biomarker in the sample.

The term "protein" as used herein indicates a polypeptide with a particular secondary and tertiary structure that can participate in, but not limited to, interactions with other biomolecules including other proteins, DNA, RNA, lipids, metabolites, hormones, chemokines, and small molecules.

The term "polypeptide" as used herein indicates an organic polymer composed of two or more amino acid monomers and/or analogs thereof. The term "polypeptide" includes amino acid polymers of any length including full length proteins and peptides, as well as analogs and fragments thereof. A polypeptide of three or more amino acids is also called a protein oligomer or oligopeptide. As used herein the term "amino acid", "amino acidic monomer", or "amino acid residue" refers to any of the twenty naturally occurring amino acids including synthetic amino acids with unnatural side chains and including both D an L optical isomers. The term "amino acid analog" refers to an amino acid in which one or more individual atoms have been replaced, either with a different atom, isotope, or with a different functional group but is otherwise identical to its natural amino acid analog.

In particular according to some embodiments a method for quantitative detection of targets is described. In some embodiments, the method comprises providing particles attaching a capture agent specific for the target.

In particular, in several embodiments, anchoring is performed by providing capture agents or other molecules that are capable to specifically bind and are therefore specific for the target to be detected. The wording "specific" "specifically" or specificity" as used herein with reference to the binding of a molecule to another refers to the recognition, contact and formation of a stable complex between the molecule and the another, together with substantially less to no recognition, contact and formation of a stable complex between each of the molecule and the another with other molecules. Exemplary specific bindings are antibody-antigen interaction, cellular receptor-ligand interactions, polynucleotide hybridization, enzyme substrate interactions etc. The term "specific" as used herein with reference to a molecular component of a complex, refers to the unique association of that component to the specific complex which the component is part of. The term "specific" as used herein with reference to a sequence of a polynucleotide refers to the unique association of the sequence with a single polynucleotide which is the complementary sequence.

The capture agents are attached on the particles so that the capture agents are presented on the particle to contact the target in a sample and form upon binding of the target a particle-target complex.

The term "attach" or "attached" as used herein, refers to connecting or uniting by a bond, link, force or tie in order to keep two or more components together, which encompasses either direct or indirect attachment such that for example where a first compound is directly bound to a second compound or material, and the embodiments wherein one or more intermediate compounds, and in particular molecules, are disposed between the first compound and the second compound or material.

The term "present" as used herein with reference to a compound or functional group indicates attachment performed to maintain the chemical reactivity of the compound or functional group as attached. Accordingly, a capture agent presented on a particle, is able to perform under the appropriate conditions the one or more chemical reactions that chemically characterize the capture agent, and in particular binding one or more targets of choice.

In some embodiments, capture agents are also provided on microbeads and within a microfluidic target sampler. The capture agents are located within the microfluidic target sampler in a configuration that allows detection of the capture agent-particle-target complex bound on the device through magnetoelectronic detection.

The microfluidic target sampler comprises a microfluidic chip, a conveyor, a capture area and electrodes connected with the capture area. In the microfluidic sampler, the microfluidic chip comprises a continuously circulated solution of microbeads; the conveyor is adapted to convey collected targets to the microfluidic chip; the capture area adapted to capture the microbeads in presence of the targets; and the electrodes connected with the capture area, are adapted to measure a change of the capture area dependent on an amount of captured microbeads thus detecting the capture of the microbeads.

In an embodiment, in the microfluidic target sampler the microfluidic chip further comprises an input filter and an output filter adapted to contain the microbeads inside the microfluidic chip. In an embodiment, in the microfluidic target sampler the continuously circulated solution of microbeads is an electro-osmotic flow of microbeads.

In an embodiment, in the microfluidic target sampler the microfluidic chip comprises a circular peristaltic pump to continuously circulate the solution of microbeads.

In an embodiment, in the microfluidic target sampler, the capture area is a surface containing capture agents adapted to bind with the microbeads through the targets. In an embodiment, in the microfluidic target sampler further comprising a filter adapted to collect the targets.

In an embodiment, in the microfluidic target sampler, the change is an electrical change, and in particular a capacitance change.

An exemplary sampler of the present disclosure is schematically illustrated in FIG. 1 wherein detection is performed in an air sample. Aerosols are collected by a filter and conveyed into a microfluidic chip, where the sample mixes with a continuously circulated solution of immunobeads (10). The beads cannot slip out due to input and output filters (11). Beads get trapped at the surface-bound-antibody area only if the immunoassay stack is completed by the presence of the pathogen (12). The bead capture is detected by a capacitance change measured through electrodes (13).

In particular, the device of FIG. 1 includes a filter stage which removes aerosols from the air circulation and collects them into the input channel of the chip (FIG. 1). The sample so obtained is then mixed with a solution of immunobeads that circle over immunoassay capture areas, e.g. by circular peristaltic pumping or electro-osmotic flow (see [Ref. 5], incorporated herein by reference in its entirety). The presence of the pathogen proteins triggers the assembly of the sandwich immunoassay and immobilizes the beads in the surface capture area. The attachment of the beads is detected by the temporal profile of a capacitance measurement through two electrodes integrated in the substrate of the microfluidic device in such a way that they straddle the surface capture area. As the bead is dielectric, the protracted capacitance increase will be significant and detectable (see [Ref. 6], incorporated herein by reference in its entirety).

The configuration exemplified in the schematic illustration of FIG. 1 allows cost-effective miniaturization of the system by avoiding optical detection. In addition, it is easily multiplexible, e.g. by allowing the sample to travel through a parallel or consecutive arrangement of such units, each containing an immunochemistry specific to a different pathogen. Moreover, a positive immunoassay result will trigger only the respective PCR test for high-fidelity confirmation, thereby accomplishing significant cost reduction and improvement in speed of response.

In some embodiments, desirable levels of capacitance change for low pathogen loads can be achieved by optimizing at least one of bead, channel, and electrode architectures. Throughput limitations can be solved by splitting the sample into suitably smaller portions and processing those portions in parallel in a batch of identical devices.

In the exemplary device and system illustrated in FIG. 1, the antigen provides the link between an antibody anchored to the surface of the microchannel and another antibody bound to a bead. As a result, the presence of the antigen ensures that the beads are anchored in specific locations along the channel. The presence of the beads would result in a capacitance change in those locations. Preliminary results are available for both the bead-labeling principle and the capacitance measurements wherein the measurement are performed as illustrated in [Refs. 6 and 10], each of which is incorporated herein by reference in its entirety.

In an embodiment, the devices methods and system can be used to perform fluidic force discrimination (FFD) assays, such as the assays described in [Ref. 10], incorporated herein by reference in its entirety, wherein analytes captured onto a microarray surface are labeled with beads. Then laminar flow is used to apply drag forces sufficient to remove only the nonspecifically-bound bead labels. The density of beads that remain bound is proportional to the analyte concentration. Bead-labeling coupled with the FFD technique achieves high specificity of detection by providing adequate protection against non-specific attachment and thus against false positives (see [Ref. 10] incorporated herein by reference in its entirety).

In an embodiment, a detection scheme is applied that requires that the surfaces of the beads and the capture areas are derivatized with different capture agents against the same antigen. For the beads, this can be accomplished in several ways: Immunobeads against many antigens are commercially available. Antibodies can also be grafted to carboxylic or amine-terminated beads (e.g. from Polysciences or Sartomer) using EDC activation (See [Ref. 5], incorporated herein by reference in its entirety). Alternatively, commercial streptavidin-coated beads can be combined with biotinylated antibodies. If the latter are not available, antibodies can be biotinylated by use of Pierce labeling kits, e.g. the Biotin-PEO-EZ-Link (See [Refs. 5, 11 and 12], each incorporated herein by reference in its entirety]. Thus, the immunobeads can be easily obtained or produced.

For the substrate, in some embodiments TeleChem epoxide glass slides are used, which covalently immobilize proteins (see www.arrayit.com). Hence, the antibodies can be deposited in droplets onto the respective capture areas on the epoxide slide and can covalently bond to the surface. A subsequent passivation step (e.g. with Tris buffer containing 0.1% BSA) can ensure that all remaining epoxide is inactivated, to prevent false positives. This approach was used to good effect in the preliminary results (see [Refs. 2-4], each incorporated herein by reference in its entirety). Next, the prepared immunobeads will be deposited in droplets in the respective reservoir areas. Then, both the beads and the bonded antibody will be lyophilized in place, e.g. by evaporation in a vacuum system.

To complete the chip, the PDMS device can be bonded on top. Traditional bonding involves baking the assembly at 80 deg C. (see [Ref. 13], incorporated herein by reference in its entirety). However, the heating might damage the protein. So, instead, the PDMS device can be bonded by activating it in oxygen plasma before attaching it to the substrate (see [Ref. 5], incorporated herein by reference in its entirety). Incidentally, the oxygen-plasma treatment doubles up as a way to make the PDMS channels hydrophilic and thus produce fluid transport by capillary action.

In some embodiments, detection is performed by measurement of capacitance change (see [Ref. 6], incorporated herein by reference in its entirety). In particular, in an embodiment, the ratio of bead's capacitance change to cell's capacitance change is equal to the ratio of bead's dielectric constant to cell's dielectric constant (so long as the geometries are identical). For example, if the bead is designed with three times the dielectric constant of the cell of highest capacitance (25 fF), 75 fF per bead will be measured.

In some embodiments, electrical wiring on the glass substrate can be obtained by depositing photoresist, expose to UV through a mask, remove the respective areas with developer, deposit metals (e.g. Au, Cr, Ti, Pt) by sputtering or evaporation, and then doing a liftoff process to remove the remaining photoresist and the excess metal. Then, the epoxide can be deposited as done by TeleChem. The assembly of the rest of the device can then follow the plan described above for antibodies and immunobeads. Another approach is to embed the metal wiring inside the PDMS itself. A third approach is to define extra channels inside the PDMS (e.g. by use of "vias", see [Ref. 9], incorporated herein by reference in its entirety) and then fill them with concentrated electrolyte solution, which would serve as effective wiring especially for high-frequency AC measurements.

In some embodiments, the electrical wiring architecture is selected based on the sensitivity desired in view of the specific target and beads to be detected. In particular, in view of laws of electromagnetism, the highest sensitivity would be achieved when each bead is captured in its own area of size comparable to the size of the bead. However, a wide dynamic range of detection requires a large number of beads. Hence, the simultaneous optimization of sensitivity and dynamic range would require a large number of individually addressable capacitors, which could make the chip too complex and expensive to wire and interrogate.

In some embodiments, providing devices and systems involve building a large number of capacitors to capture many beads (ensuring wide dynamic range), while connecting the capacitors into sub-circuits (ensuring ease of wiring and interrogation). It can be shown analytically that the best architecture is the one in which all capacitors are connected in parallel. Then, the effective capacity is the sum of individual capacities. Therefore, as any particular capacitor captures a bead and increases its capacity, the effective circuit capacity increases by the same amount. Thus, in some embodiments, the step-wise sensitivity of the circuit is the same as the one of an individual capacitor.

In an embodiment, each of the capacitors is smaller and thus more sensitive than the one in the preliminary data (see [Ref. 6], incorporated herein by reference in its entirety). In some embodiments, the chip can use metallic-core beads instead of cells, resulting in a far larger change in the effective dielectric constant and thus a larger change in capacity upon capture. Hence, in some embodiments, the overall circuit is expected to be far more sensitive than previous systems of the art. Thus, the stepwise change in capacity will be easily measurable with the commercially available electronics, e.g. used in (see [Ref. 6], incorporated herein by reference in its entirety).

In an embodiment, a plurality of microfluidic target samplers according to the present disclosure can be comprised in an arrangement possibly, but not necessarily operated according to a quantification scheme herein described.

In particular in an embodiment, the microfluidic target samplers of the arrangement are serially connected to each other, and, during operation, the uncaptured targets travel from one microfluidic target sampler to another microfluidic target sampler.

In an embodiment, targets can be detected by continuously circulating a microfluidic solution of microbeads; and conveying collected targets to the continuously circulating microfluidic solution of microbeads. In those embodiments the microbeads are captured in presence of the targets forming microbead-target complexes; and the targets detected by measuring changes due to presence of the microbead-targets complexes, and in particular by measuring capacitance changes.

In an embodiment, the detection can be performed in an apparatus that comprises a plurality of reservoirs commonly exposed to a target-containing sample; and a plurality of arrangements of the present disclosure, with each arrangement connected to a respective reservoir of the plurality of reservoirs. In the apparatus, each reservoir of the plurality of reservoirs contains a set number of microbeads; and each arrangement of the plurality of arrangements measures a plurality of capacitance changes to associate each capacitance change to a respective set number of microbeads and express variation of numbers of microbeads as a function of captured microbeads.

In an embodiment, in the apparatus the set number of microbeads of one reservoir is different from the set number of microbeads of another reservoir.

In some embodiments quantification is reduced to correlating the analyte concentration with the number of captured and detected beads.

In particular, in some embodiments, knowledge of the number of captured beads can be converted into knowledge of the antigen concentration. If, for example, the amount of antigen (concentration times volume) is far greater than the total number of available sites on the beads (number of beads M times number of sites per bead), virtually all beads will be saturated with antigen and virtually all beads will be anchored at capture sites downstream. Conversely, if, for example, the amount of antigen is very low compared to the total number of sites on the beads, the antigen will be distributed over the surface of all beads at very low surface density, which will result in insufficiently strong anchorage to keep any of the beads bound to the detection sites. Thus virtually no beads will be anchored.

Figure 2:
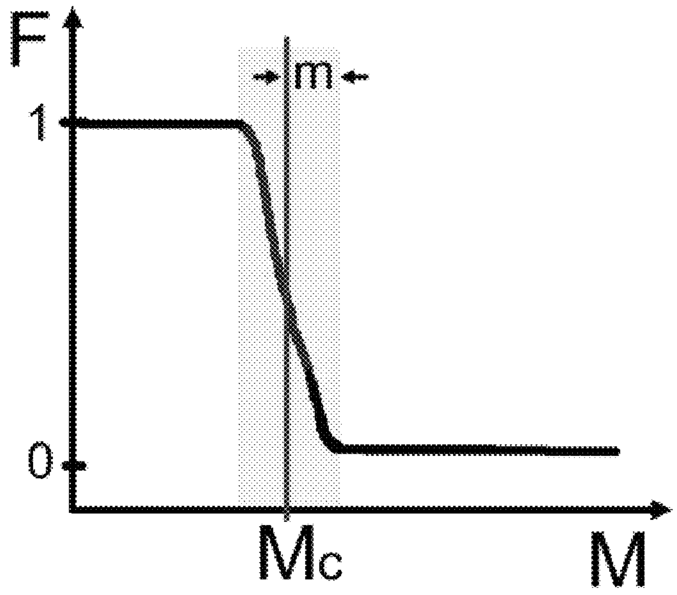
FIG. 2 shows a diagram illustrating a quantitation scheme according to an embodiment herein described.

Hence it is expected that for a fixed input concentration of antigen, fixed sample volume, and varying number M of available beads in the reservoir, there will be a critical number $M_c$, around which there is a sharp decrease in the fraction F of anchored beads such as the one illustrated in the distribution of FIG. 2. This critical number will depend on the drag force of each bead (and thus on the flow speed), the strength of the binding, the density of sites on the bead surface, the size of the bead, and the concentration of antigen. The half-width "m" of the region of precipitous change will depend on the constancy of the flow speed and the uniformity of the distribution of antigen over the surface area of the beads.

The fact that $M_c$ depends on the concentration of analyte suggests that a standard calibration curve can be established between the two by use of known concentrations of commercial antigen. The standard curve can then be used to calculate unknown concentrations of analyte by measuring $M_c$ as done in FIG. 2.

In general, in several embodiments, Mc is expected to increase with increasing analyte concentration, and the dependence is expected to be roughly linear and mathematically one-to-one and suitable for calibration.

Detection can be performed according to various techniques including electrical detection and optical detection which can be performed according to various techniques identifiable by a skilled person upon reading of the present disclosure.

In an embodiment, a variation described above can be detected via a single-point measurement, in which case the operative assumption is that number of bound beads is roughly proportional to the fed concentration (as in Mulvaney, [Ref. 10], incorporated herein by reference in its entirety). Then the occupancy number can be directly correlated with fed concentration into a calibration curve.

In an embodiment, a variation described above can be detected via a single-point measurement combined with the recalibration technique described in the U.S. patent application Ser. No. 12/717,402 incorporated herein by reference in its entirety. For example, a single-point measurement can be performed with different reservoirs with same number of beads, each spiked with known but different amounts of lyophilized analyte analog, so that a recalibration curve can be constructed of occupancy as a function of added analog amount. Then the unknown concentration can be extracted as the occupancy at zero spike, divided by the slope of the curve, since occupancy will increase with increasing amount of analog. In an embodiment, a range of spiked concentrations can be detected.

In an embodiment, quantitative detection is performed by exposing a plurality of reservoirs to a target-containing sample and connecting each reservoir to an arrangement herein described, thus forming a plurality of arrangements. Each reservoir contains a set number of microbeads and for each arrangement, a capacitance change associated to capture of microbeads is measured, thus obtaining a plurality of capacitance changes. Each capacitance change is associated to a set number of microbeads, and is in particular expressed in terms of fraction of the set number of microbeads that have been captured, so that by obtaining the plurality of capacitance changes a plurality of fractions is obtained. Each fraction is associated to a set number of microbeads, thereby establishing fraction of captured microbeads as a function of number of microbeads. The target concentration in the sample is then measured by selecting a number of microbeads inside a region of the function where the fraction of captured microbeads is variable; and associating the selected number of microbeads to a concentration value.

In an embodiment, the selected number is a number lying between a first number, where the fraction of captured microbeads starts to precipitously decrease and a second number where the fraction of captured microbeads stops to precipitously decrease.

In an embodiment, the selected number is in the middle between the first number and the second number.

In an embodiment, the sample is adapted to contain a plurality of different targets, and wherein the plurality of reservoirs comprises subsets of target-specific reservoirs, each subset comprising a sub-plurality of reservoirs, each sub-plurality of reservoirs comprising a set number of microbeads specific to a particular target, thus allowing measure of target concentration for each target.

In an embodiment, quantification of a particular analyte is accomplished by assembling a compound dynamic range from the dynamic ranges of detection corresponding to each of the reservoirs in the system described above. Each reservoir then has its own calibration curve of capture fraction as a function of concentration, while different reservoirs have different numbers of beads inside them. As a result, the same general look of the calibration curve will be shifted to different ranges along the concentration axis. As a result, a compound measurement of the captured fractions from all reservoirs, all at the same fixed unknown concentration of fed analyte, would produce a set of values that can be used to estimate the unknown concentration. For example, some reservoirs will be saturated while others will have virtually no capture, but there will also be some of intermediate number of beads, which will be in their linear regime at that concentration and thus can be used to calculate the unknown concentration through calibration. Since each reservoir has different dynamic range, the set of reservoirs will have a composite dynamic range of quantification, which would be much wider than each of the constituent ranges. This technique can be used, for example, when the analyte concentration can vary widely.

In an embodiment, the above multi-range scheme can be multiplexed to be applied simultaneously in parallel for a multiple of different analytes within the same sample or within parallel samples. In an embodiment, each analyte would have its own independent system of reservoirs and detection chambers, to be used as described above for the single-analyte example.

In some embodiments, detection is performed in fluids other than air, for example bodily fluid such as blood. In other words, a point-of-care blood test using whole blood is provided.

Figure 3:
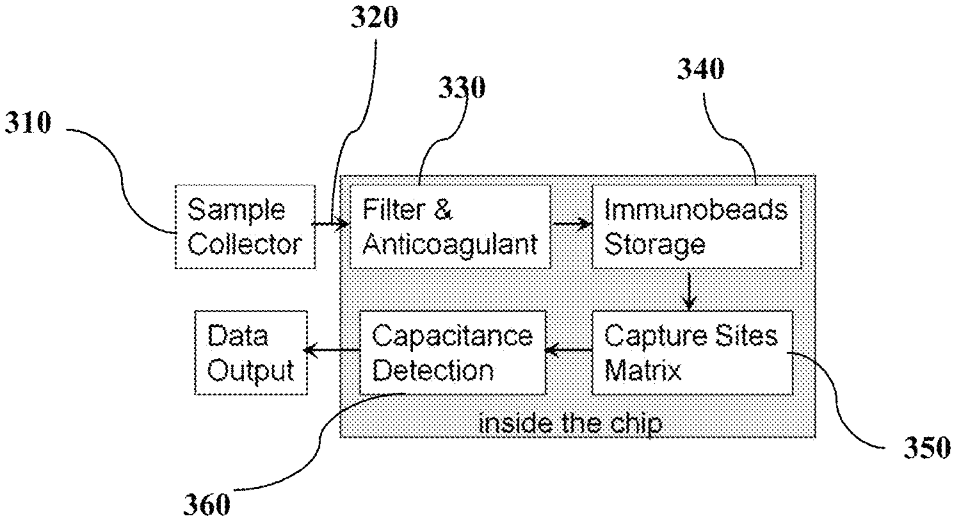
FIG. 3 shows a diagram of a system according to an embodiment herein described.

The flowchart of the overall system for those embodiments is shown in FIG. 3. A sample is collected by pricking the finger of the patient with a capillary tube or sample collector (310) inserted into an input port of the chip (320). Capillary action (or blood pressure of the patient's body or thumb pressure onto the device) draws the blood into the chip. Once inside, the blood enters an area containing dry anticoagulant (e.g. heparin, citric acid), which dissolves in the blood and prevents its coagulation. Next, the blood reaches a filtering stage, which stops the blood cells but lets the supernatant through. The anticoagulant and filtering stage have been indicated as (330) in FIG. 3. The resulting plasma enters a storage area (340) containing beads labeled with antibodies against the antigen of interest. The plasma resuspends the beads while the antigens diffuse to the bead surfaces and bind to the antibodies.

In the next area (350), antibodies immobilized on the microchannel substrate await the arrival of the beads and the antigen. The presence of the antigen ensures the completion of the sandwich immunoassay, thereby anchoring the beads to the channel surface. Any unbound beads are washed away by more incoming sample. The anchored beads change (360) the local capacitance since the dielectric constant of their material is higher than the one of the fluid. The change is measured by outside electronics and converted into a value for the analyte concentration. The device and method shown in FIG. 3 can be a one-time disposable device and method.

In some embodiments, the filtration stage of the above system is provided by an on-chip production of plasma from whole blood. In some of those embodiments, the elastomer surface of the microfluidic channels is made hydrophilic to enable fluid transport by capillary action. That can be achieved by several methods, including oxygen-plasma treatment (see [Ref. 5], incorporated herein by reference in its entirety), treatment with HCl acid (see [Ref. 5], incorporated herein by reference in its entirety), and covalent grafting of polyethylene glycol (See [Ref. 7], incorporated herein by reference in its entirety].

Anticoagulant can be deposited in buffer droplets onto designated areas on the substrate and then dried in place. Assembling the elastomer chip onto the substrate will lock the anticoagulant in the respective reservoirs. If droplet volumes prove too small to deposit easily by hand, a sacrificial chip (see [Ref. 9], incorporated herein by reference in its entirety) will be used to pattern them onto the substrate and dry them in place. Then the sacrificial chip will be peeled off and replaced with the filtering chip.

Figure 4:
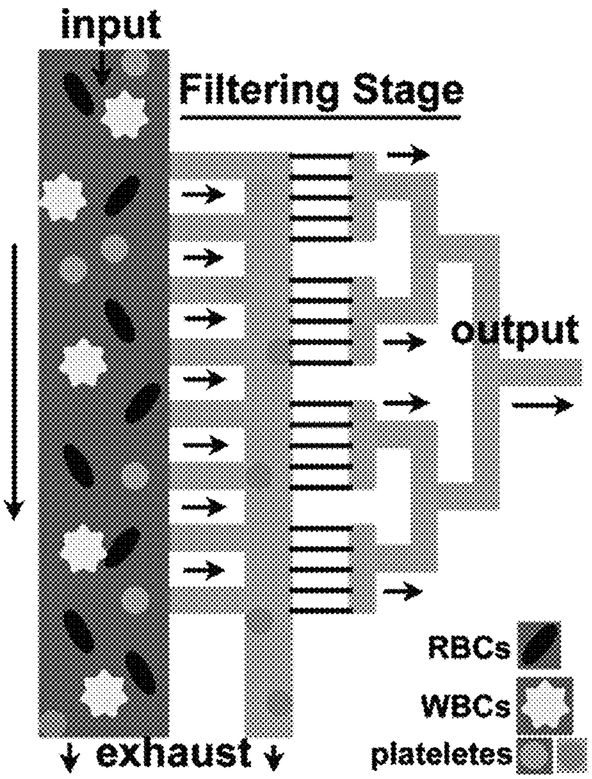
FIG. 4 shows a schematic illustration of a filtration system according to an embodiment herein described.

In some embodiments, on-chip filtration of the heparinated whole blood is achieved by a microfluidic cross-flow filtration technique described in the preliminary results indicated in the Examples section. In some embodiments, filtering can be performed by a filtering cascade as schematically illustrated in FIG. 4. In the illustration of FIG. 4, white blood cells (stars), red blood cells (discs) and platelets (circles) initially flow along the main channel, which is made tall and wide to accommodate them. Plasma is cross-flow-filtered into lateral narrow channels, which connect to a secondary "main channel". The platelets that still make it to this stage are now washed down this secondary channel to the same exhaust, while plasma is again cross-flow-filtered by even narrower channels and then collected into output.

In the illustration of FIG. 4, the tall (dark gray) and short (light gray) channels are defined in the elastomer material of the chip by soft lithography (see [Ref. 13], incorporated herein by reference in its entirety) with hybrid molds (See [Refs. 5 and 9], each incorporated herein by reference in its entirety). The smallest channels (black) would be simple grooves etched in the substrate and sealed on top by the elastomer slab of the chip. These grooves would extend for a short distance under the channels defined in the elastomer. In some embodiments, this cascade of filtering stages will ensure the removal of platelets and cell fragments and thus will be superior to its predecessors in terms of both the quality of its output (see [Ref. 15], incorporated herein by reference in its entirety) and the simplicity of its fabrication and operation (see [Ref. 14], incorporated herein by reference in its entirety).

Figure 5:
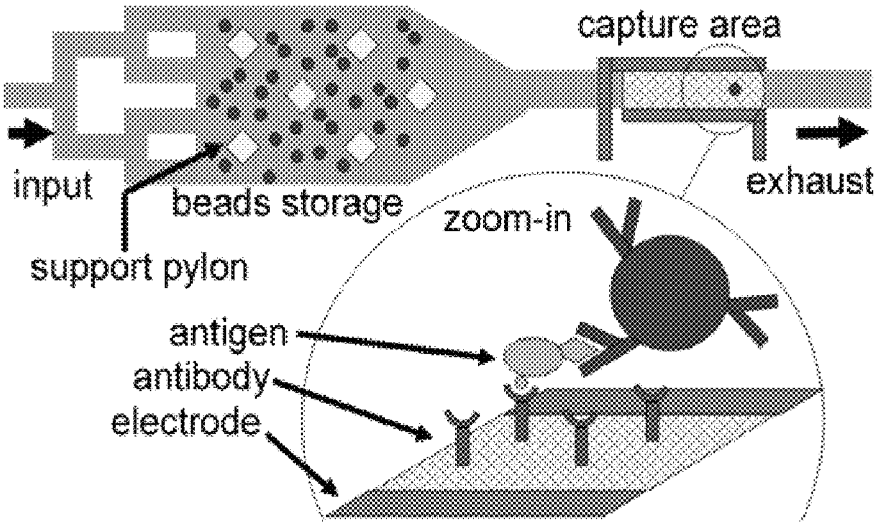
FIG. 5 shows a schematic illustration of detection performed according to an embodiment herein described.

In some embodiments, inside the chip, the ready plasma is fed into a reservoir containing identical beads (FIG. 5). Inbuilt PDMS pylons (light gray squares) prevent collapse of the reservoir chamber. The beads are resuspended and carried away by the current to a capture area, where different antibodies against the same antigen have been immobilized between electrodes. If the sought antigen is present, the sandwich immunoassays are completed and beads are anchored to the surface. Their presence changes the capacitance across the channel, as measured through the adjacent electrodes (gray).

Figure 6:
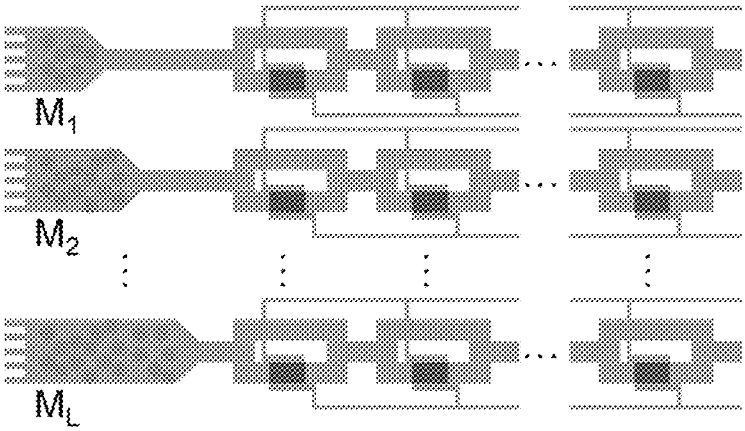
FIG. 6 shows a schematic illustration of a detection stage performed according to an embodiment herein described

In embodiments, where the sample is a fluid other than air, (e.g. bodily fluids of a human being such as blood) and wherein the antigen concentration is detected by measuring F as a function of M in that sample according to the schematic illustration of FIG. 6, the measurement can be performed in various ways.

In some embodiments, such F measurement can be performed by aliquoting of the sample to multiple parallel reservoirs containing a varying number of beads $M_i$, while the spare volume in each reservoir is kept the same throughout the array to ensure that equal doses of antigen are captured on varying numbers of beads. The respective architecture is shown in the schematic illustration of FIG. 6.

The fluidic architecture schematically illustrated in FIG. 6 also has an in-built self-organization feature. In particular, in the embodiment shown in FIG. 6 every capture area is shunted by parallel channel of equal resistance. So long as no beads attach in the capture area, the fluidic resistance along both pathways is the same and therefore fluid flow moves through them with equal throughputs. However, once the capture area immobilizes a bead, the fluidic resistance increases because of the presence of the bead, and most of the flow is diverted through the shunt. Hence, subsequent beads do not clog the original channel but instead quickly move through the shunt and are anchored in subsequent capture areas.

The architecture exemplified in the illustration of FIG. 6 is designed to maximize the chances that the two-dimensional capture matrix does not become quickly clogged with beads at its entrance sites. The result is a highly efficient and robust device.

In some embodiments, the target detection can be performed by multiplexing the single-analyte device into a multi-analyte device. For example, highly abundant analytes would require a higher percentage of the reservoir volume to be occupied by beads, so that more bead surface area is available to bind analyte from less volume. Such an arrangement is expected to shift the dynamic range to higher concentrations, preventing saturation at the expense of sensitivity. For less abundant analytes, the opposite arrangement (fewer beads, larger volume), will shift the dynamic range to lower concentrations, increasing sensitivity at the risk of saturation. Thus the system can be tuned to have its dynamic range match the medically relevant range of the particular analyte of interest.

Figure 7:
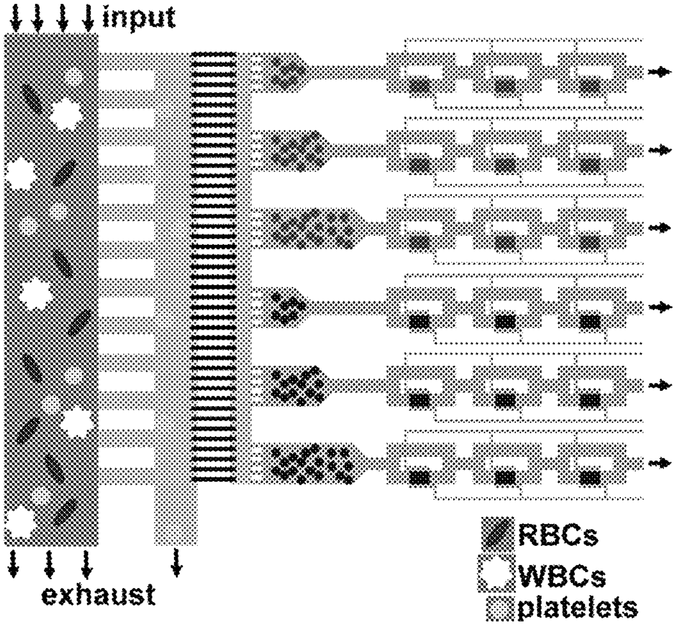
FIG. 7 shows a schematic illustration of an integrated detection system according to an embodiment herein described.

In some embodiments, a multi-analyte chip can be built by integrating sub-units identical to the optimized single-analyte chip. That integration can be made straightforward by the inherent compatibility (See [Ref. 5], incorporated herein by reference in its entirety) of elastomeric microfluidic devices fabricated by the same multi-layer soft-lithography techniques (See Ref. 13, incorporated herein by reference in its entirety). FIG. 7 shows an example for the combined architecture. The integration allows the same sample preparation stage to be used for multiple quantification stages keyed to the different analytes, increasing the overall efficiency and saving space in such large-scale integration of microfluidic components.

The method to quantitatively detect target herein described can be performed with various devices comprising, for example, microtiter plates, microfluidic devices of various kind, and additional devices identifiable by a skilled person upon reading of the present disclosure.

In particular, in some embodiments, the methods herein described can be performed on microfluidic chips. The term "microfluidic" as used herein refers to a component or system that has microfluidic features e.g. channels and/or chambers that are generally fabricated on the micron or sub-micron scale. For example, the typical channels or chambers have at least one cross-sectional dimension in the range of about 0.1 microns to about 1500 microns, more typically in the range of about 0.2 microns to about 1000 microns, still more typically in the range of about 0.4 microns to about 500 microns. Individual microfluidic features typically hold very small quantities of fluid, e.g. from about 10 nanoliters to about 5 milliliters, more typically from about 100 nanoliters to about 2 milliliters, still more typically from about 200 nanoliters to about 500 microliters, or yet more typically from about 500 nanoliters to about 200 microliters.

In particular in some embodiments, methods herein described can be performed on the microfluidic chip described in [Refs. 2-4], each herein incorporated by reference in its entirety. In some embodiments, a particular device can be engineered to the specifications set by the recalibration method on the one hand, and the intended ability to measure multiple analytes, on the other hand.

In several embodiments, the devices methods and system can be used to perform reliable quantitative detection with biomedical samples. In particular, in some embodiments, methods and systems herein described can be applied for reliable target detection in whole blood, serum, plasma, urine, saliva, cerebrospinal fluid, vaginal fluid, sweat, tears, swab extract, and similarly complexed samples.

In some embodiments, sample preparation can be performed by conventional macro-scale methods. For example, serum preparation from whole blood involves centrifugation of the coagulated material, and only after that can the serum be inserted in the measurement device. In some embodiments sample-preparation can be performed through microfluidic methods and systems that can complement the capabilities of microfluidic measurement devices.

In some embodiments, sample preparation device can be integrated in the same device, to simplify handling and to minimize sample wastage.

In some embodiments, the devices methods and system of the present disclosure are applicable to a broad range of clinical diagnostic tests that are based on quantifying proteins in human plasma.

In some embodiments, the devices methods and system of the present disclosure allow reduction in required sample volume and related new types of clinical and fundamental studies, e.g. a broad, multianalyte screening of a large number of small-volume samples from existing bio-banks organized by the respective symptomatic pathologies, e.g. multiple sclerosis, particular types of cancer, etc.

In some embodiments, the devices methods and system of the present disclosure have the inherent capability of multi-analyte detection, which is expected to cut costs, while the system would also use up only a small fraction of the precious banked sample.

In some embodiments, the devices methods and system of the present disclosure can be used in connection with routine biomedical diagnostics.

In some embodiments, devices methods and systems herein described allow decentralized "point-of-care" (POC) diagnostics (see, e.g., [Ref. 1], incorporated herein by reference in its entirety] which can reach ubiquity if the current biological techniques are reduced from the macro- to the nanoscale, in multi-analyte high-throughput compact devices. In particular, reducing immunoassays to microfluidic format has been actively explored in recent years. (see e.g., [Ref. 8], incorporated herein by reference in its entirety.

In some embodiments, the devices methods and systems, herein described can be used to detect pathogens in fluids and in particular in air.

In some embodiments, methods and system will be of high utility, e.g. in monitoring the air circulation systems of federal and commercial buildings that are potential targets of bioterrorism. In some embodiments, are expected to allow a sensitivity comparable with PCR-based systems coupled with practicality of continuous monitoring.

EXAMPLES

The devices, methods and systems herein described are further illustrated in the following examples, which are provided by way of illustration and are not intended to be limiting.

In particular, the following examples illustrate an exemplary device, methods and systems herein described with reference to detection of protein analytes performed with a method to quantitatively detect a target herein described. A person skilled in the art will appreciate the applicability of the features described in detail for detection of those biomarkers for additional biomarkers or targets in general according to the present disclosure.

Additional details concerning procedures used and results obtained are reported below.

Example 1

Calibration Curve Between Occupancy and Analyte Concentration—(Prophetic)

Figure 8:
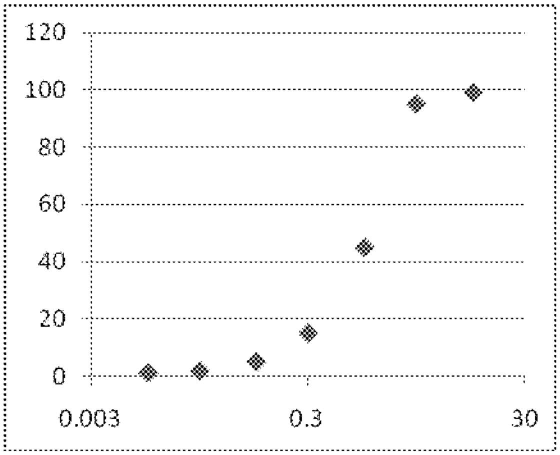
FIG. 8 shows a diagram illustrating a quantitation scheme according to an embodiment herein described.

The distribution shown in FIG. 8 provides an example of a calibration curve between occupancy (bound beads) (in percentage units) and analyte concentration (in nM) for single-point measurements, in which the number of starting beads is kept the same but different concentrations of known analyte are initially fed in order to build the curve of FIG. 8.

In the particular case, several characteristic regions are clearly identifiable. First, for very low concentrations, the system would see occupancy close to zero. If the concentration is increased, eventually a point will be reached when the occupancy will pick up. This point is the detection limit of the system. For the graph of FIG. 8, that point is likely the one about 0.1 nM. As concentration increases further, the system enters a linear regime, in which the occupancy is roughly proportional to the concentration. As the concentration increases further, the system saturates and the occupancy is no longer linear with concentration. This is expected because beyond a certain point adding more analyte to the surface of the bead will not improve its chances to anchor as the probability is already close to 100%. This saturation point is roughly around 3 nM in the shown prophetic example. The dynamic range of the system is then between 0.1 nM and 3 nM. Note that the dynamic range of the system under this quantification method is very limited, because the number of beads is fixed regardless of concentration. So, another way to look at this is that the number of beads determines the location of the dynamic range of the system.

The expectation is based on the assumption that each reservoir gets the same volume of sample, but there are different numbers of beads in each reservoir, the distribution of analyte on the bead surface will be different in each reservoir. On the other hand, how many analytes attach per bead will determine how likely it is for a bead to become anchored to the surface of the capture chambers. So, reservoirs with fewest beads will have highest analyte surface density, which means that virtually all of the beads would anchor and the respective occupancies will be close to 100%. Conversely, reservoirs with the most beads will have the lowest analyte surface density, which means that few beads will anchor and thus the occupancies for such reservoirs will be close to 0%. The most likely distribution of percentile occupancies as a function of starting beads number (M) in the reservoir is similar to a titration curve (e.g. as shown in FIG. 2). Such a curve has a characteristic M where there is a precipitous change in the occupancy ($M_c$). It must depend on concentration of analyte. For example, if a higher concentration is fed, $M_c$ would increase, because more analyte means reservoirs with a higher number of starting beads would now have enough analyte surface density to have beads anchor. So, if $M_c$ is correlated with concentration, a calibration can be established by plotting the values of $M_c$ versus the values of known concentrations of analyte that produced it. It is expected that that calibration will be essentially linear and mathematically one-to-one.

Example 2

Detection Performed with an Array of Reservoirs—(Prophetic)

If detection performed with a wider dynamic range is desired according to a certain experimental design, a more advanced approach is to perform the detection with an array of reservoirs, each with a different number of beads. If the same concentration is fed to each reservoir, then different reservoirs will be at different regimes (nondetection, linear, or saturation). With proper calibration, they will yield similar estimates of the concentration, albeit using different calibration curves. In the example shown in the FIG. 9, there are two separate reservoirs, whose results are represented by squares and diamonds.

Figure 9:
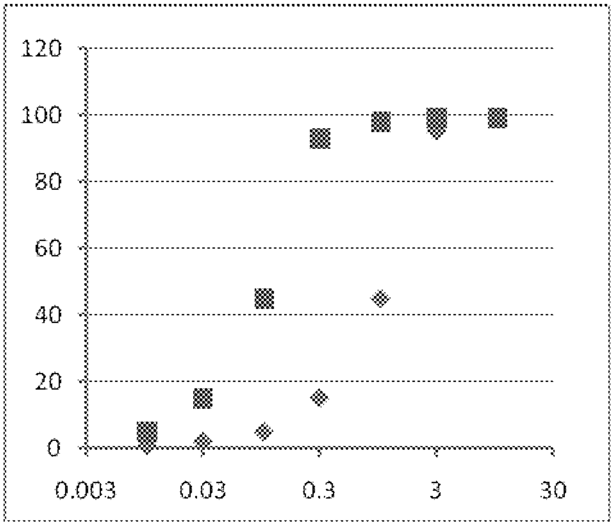
FIG. 9 shows a diagram illustrating a quantitation scheme according to an embodiment herein described.

FIG. 9 is similar to FIG. 8, except for the addition of a second reservoir, whose datapoints are designated by squares, while the reservoir from the previous example is shown in diamonds. Applying the same ideas as before, we can see that the diamonds' reservoir still has dynamic range of 0.1-3 nM, but the squares' reservoir has dynamic range of 0.01-0.3 nM. Thus the overall dynamic range of the multi-reservoir system is 0.01-3 nM, which is much better than the component ranges. This method is yet another way to use the architectures shown in FIG. 6. So, it is yet another quantification scheme within the same general method of the invention.

Example 3

Detection of Dynamic Ranges—(Prophetic)

The scheme exemplified in Example 2 can be applied to situations where the individual dynamic ranges of the constituent reservoirs become very narrow. Then for each M, occupancy is mostly close to zero or to 100, except for a very narrow range of concentrations, which range is a function of M. Then a table can be constructed that shows at what concentrations which M values are within detection range. The table can be reconstructed in a calibration curve, which is functionally identical to the calibration curve described farther above between $M_c$ and concentration. So, the previously described method based on measurement of $M_c$ is just the narrow-range limit of the more general method described in Example 2.

In that limit, $M_c$ is the number of beads for which the occupancy is neither saturated nor close to zero at the fed concentration. But each M has its own curve of occupancy vs. concentration.

The examples set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, Detailed Description, and Examples is hereby incorporated herein by reference.

It is to be understood that the disclosures are not limited to particular compositions or biological systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any devices, methods and materials similar or equivalent to those described herein can be used in the practice for testing of the products, methods and system of the present disclosure, exemplary appropriate products, materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

REFERENCES

[1] Gilbert, H. C. & Szokol, J. W. Point of care technologies. *Int. Anesthesiol. Clin.* 42 (2), 73-94 (2004).

[2] Kartalov, E., Zhong, J., Scherer, A., Quake, S., Taylor, C. & Anderson, W. High-Throughput Multi-Antigen Microfluidic Fluorescence Immunoassays. *BioTechniques* 40: 85-90 (2006).

[3] Kartalov, E. P., Lin, D. H., Lee, D. T., Anderson, W. F., Taylor, C. R., and Scherer, A. (2008) Internally Calibrated Quantitations of Protein Analytes in Human Serum by Fluorescence Immunoassays in Disposable Elastomeric Microfluidic Devices, *Electrophoresis,* 29, 5010-5016.

[4] Lin, D. H., Taylor, C. R., Anderson, W. F., Scherer, A., Kartalov, E. P. (2009) Internally calibrated quantification of VEGF in human plasma by fluorescence immunoassays in disposable elastomeric microfluidic devices, *J Chromatogr B,* 878, 258-263.

[5] Kartalov, E. P., Anderson, W. F., and Scherer, A. "The Analytical Approach to PDMS Microfluidics and Its Biological Applications." *J Nanosci. Nanotech.,* 6, 1-13, (2006).

[6] Sohn, L. L., Saleh, O. A., Facer, G. R., Beavis, A. J., Allan, R. S., & Notterman, D. S., Capacitance cytometry: Measuring biological cells one by one. *Proc. Natl. Acad. Sci. USA* 97(20): 10687-10690 (2000).

[7] Kartalov, E. P. and Quake, S. R. Microfluidic device reads up to four consecutive basepairs in DNA sequencing-by-synthesis, *Nuc. Acids Res.* 32 (9), 2873-2879 (2004).

[8] Thorsen, T., Maerkl, S. J. & Quake, S. R. Microfluidic Large-Scale Integration. *Science* 298, 580-584 (2002).

[9] Kartalov, E. P., Walker, C., Taylor, C. R., Scherer, A., and Anderson, W. F., Microfluidic Vias Enable Nested Bioarrays and Autoregulatory Devices in Newtonian Fluids. *Proc. Natl. Acad. Sci. USA* 103:33, 12280-12284 (2006).

[10] Mulvaney, S. P.; Cole, C. L.; Kniller, M. D.; Malito, M. et al. Rapid, femtomolar bioassays in complex matrices combining microfluidics and magnetoelectronics. Biosens. Bioelectron., 23, 191-200 (2007).

[11] Kartalov, E. P., Unger, M. A. and Quake, S. R. (2003) Polyelectrolyte Surface Interface for Single-Molecule Fluorescence Studies of DNA Polymerase. *BioTechniques* 34:505-510

[12] Braslaysky, I., Hebert, B., Kartalov, E. and Quake, S. R. (2003) Sequence information can be obtained from single DNA molecules. *Proc. Nat'l Acad. Sci. USA* 100: 3960-3964

[13] Unger, M. A.; Chou, H. P.; Thorsen, T.; Scherer, A.; Quake, S. R. Monolithic Microfabricated Valves and Pumps by Multilayer Soft Lithography. Science 288, 113-116 (2000).

[14] VanDelinder, V., Groisman, A. Separation of plasma from whole human blood in a continuous cross-flow in a molded microfluidic device, Anal. Chem. 78, 3765-3771 (2006).

[15] Fan, R.; Vermesh, O.; Srivastava, A.; Yen, B. K. H.; Qin, L.; Ahmad, H.; Kwong, G. A.; Liu, C. C.; Gould, J.; Hood, L.; Heath, J. R. Integrated barcode chips for rapid, multiplexed analysis of proteins in microliter quantities of blood. Nat. Biotechnol. 26:12, 1373-1378 (2008).

What is claimed is:

1. A microfluidic target sampler comprising:

a microfluidic chip comprising a substantially circular area;

a conveyor adapted to convey collected targets to the microfluidic chip;

a pair of filters adapted to confine microbeads from a solution within the microfluidic chip;

a capture area in the substantially circular area and independent of the pair of filters;

an immunoassay stack in the capture area, configured to be completed by presence of the targets, thereby enabling capture of the microbeads exclusively in the presence of the targets;

electrodes connected with the capture area, the electrodes adapted to measure a change of the capture area dependent on an amount of captured microbeads thus detecting the capture of the microbeads; and a circulator connected to the substantially circular area and configured to continuously circulate the microbeads in the substantially circular area.

2. The microfluidic target sampler of claim 1, wherein the pair of filters adapted to confine the microbeads within the microfluidic chip comprises an input filter and an output filter adapted to contain the microbeads inside the microfluidic chip.

3. The microfluidic target sampler of claim 1, wherein the circulator circulates the solution of microbeads by way of an electroosmotic flow.

4. The microfluidic target sampler of claim 1, wherein the circulator comprises a peristaltic pump to continuously circulate the solution of microbeads.

5. The microfluidic target sampler of claim 1, wherein the capture area is a surface containing capture agents adapted to bind with the microbeads through the targets.

6. The microfluidic target sampler of claim 1, further comprising a filter adapted to collect the targets.

7. The microfluidic target sampler of claim 1, wherein the change is an electrical change.

8. The microfluidic target sampler of claim 1, wherein the change is a capacitance change.

9. A method of using a microfluidic target sampler, the method comprising: detecting target concentration through a single microfluidic target sampler, the single microfluidic target sampler being the microfluidic target sampler of claim 1, and wherein the amount of captured microbeads is substantially proportional to concentration of the targets.

10. A method to measure target concentration in a sample, comprising:

feeding a plurality of known target concentrations to the microfluidic target sampler of claim 1, for each of said known target concentrations, measuring a capacitance change associated to the capture of the microbeads and expressing said capacitance change in terms of a first fraction, the first fraction being a ratio of the captured microbeads to all microbeads in said solution of microbeads, the first fraction related to the known target concentration, thus obtaining a first function which is of the first fraction versus the known target concentration;

and feeding an unknown target concentration to the microfluidic target sampler of claim 1;

and for the unknown target concentration, measuring a capacitance change associated to the capture of the microbeads and expressing said capacitance change in terms of a second fraction of the captured microbeads, the second fraction related to the unknown target concentration; thus obtaining a second function which is of the second fraction versus the unknown concentration, and comparing the first function versus the second function.

11. The method of claim 10, wherein the feeding of the known target concentrations to the microfluidic target sampler of claim 1 comprises feeding a plurality of different known target concentrations to a respective plurality of identical microfluidic target samplers according to claim 1, and wherein the step of feeding the unknown target concentration to the microfluidic target sampler of claim 1 comprises feeding the unknown target concentration to yet another microfluidic target sampler according to claim 1.

12. An arrangement of multiple microfluidic target samplers, comprising a plurality of the microfluidic target samplers according to claim 1.

13. The arrangement of claim 12, wherein the microfluidic target samplers are serially connected to each other, and wherein uncaptured targets travel, during operation, from one of said plurality of microfluidic target samplers to another of said microfluidic target samplers.

14. An apparatus comprising:

a plurality of reservoirs exposed to a target-containing sample, a plurality of arrangements according to claim 12 or 13, each of said arrangements connected to a respective reservoir of the plurality of reservoirs, and measuring a plurality of capacitance changes to associate each of said capacitance changes to a respective set number of the microbeads and expressing variation of the numbers of the microbeads as a function of captured microbeads.

15. The apparatus of claim 14, wherein the set number of the microbeads of one of the plurality of said reservoirs is different from the set number of microbeads of another of the plurality of said reservoirs.

16. A method to measure target concentration in a sample, comprising:

exposing a plurality of reservoirs to a target-containing sample, each reservoir containing a set number of microbeads;

connecting each of said plurality of reservoirs to an arrangement according to claim 12 or 13, thus forming a plurality of arrangements;

for each of said plurality of arrangements, measuring a capacitance change associated to the capture of the microbeads, thus obtaining a plurality of capacitance changes, each of said plurality of capacitance changes associated to the set number of the microbeads;

expressing each of said plurality of capacitance changes in terms of a fraction of the set number of microbeads that have been captured to all microbeads in the solution of microbeads, thus obtaining a plurality of fractions, each of said plurality of fractions associated to a set number of the microbeads, thereby establishing a fraction of the captured microbeads as a function of the number of microbeads;

selecting a number of microbeads inside a region of the function; and associating the selected number of microbeads to a concentration value to form a calibration when input concentration of the target is known, or associating the selected number of microbeads to a concentration value through a known calibration, to measure unknown concentration of the target in the sample.

17. The method of claim 16, wherein the selected number is a number lying between a first number where the fraction of captured microbeads starts to precipitously decrease and a second number where the fraction of captured microbeads stops precipitously decreasing.

18. The method of claim 17, wherein the selected number is a middle between the first number and the second number.

19. The method of claim 16, wherein the sample is adapted to contain a plurality of different targets, and wherein the plurality of reservoirs comprises subsets of target-specific reservoirs, each subset comprising a sub-plurality of reservoirs, each sub-plurality of reservoirs comprising the set number of the microbeads specific to a particular target, thus allowing measure of target concentration for each of the different target.

20. The method of claim 16, wherein the set number of microbeads is selected inside a region of the function where the fraction of the captured microbeads is substantially linear with respect to the set number of microbeads.

21. The method of claim 16, wherein the target concentration is measured with a single measurement when the fraction of captured microbeads is substantially linear with respect to the number of microbeads.

22. The method of claim 16, wherein the target concentration is measured with multiple measurements, the set number of microbeads changing with each measurement.

23. A method to measure target concentration in a sample, comprising:

a) exposing a plurality of reservoirs to a target-containing sample, each reservoir containing a set number of microbeads, the set number of microbeads of one reservoir being different from the set number of microbeads of another reservoir, each of said reservoirs connected to an arrangement according to claim 12 or 13, thus forming a plurality of arrangements;

b) feeding to the plurality of reservoirs known target concentrations;

b1) for each of said arrangements, measuring a capacitance change associated to the capture of the microbeads, thus obtaining a plurality of capacitance changes, each capacitance change associated to a set number of captured microbeads, and b2) for each set number of captured microbeads, expressing each capacitance change in terms of fraction of the set number of microbeads that have been captured to the total microbeads in the solution to form a known fraction, thus obtaining a plurality of known fraction versus concentration functions; c) feeding to the plurality of reservoirs an unknown target concentration;

c1) for each arrangement, measuring a capacitance change associated to the capture of said microbeads, thus obtaining a plurality of capacitance changes, each the capacitance changes associated to a set number of captured microbeads;

c2) for each of the set number of microbeads, expressing each capacitance change in terms of a fraction of the set number of microbeads that have been captured to the total microbeads in the solution to form an unknown fraction, thus obtaining an unknown fraction versus number of microbeads function; and d) comparing the known fraction versus number of microbeads function with the unknown fraction versus concentration functions to find the unknown target concentration.

24. The microfluidic target sampler of claim 1 wherein the microbeads further comprises immunobeads.

25. The microfluidic target sampler of claim 3, wherein the circulator comprises first electrodes attached to a surface of the substantially circular area.

26. The microfluidic target sampler of claim 25, wherein the circulator further comprises second electrodes electrically isolated from the substantially circular area but electrically connected with an internal volume of the substantially circular area.

* * * * *